United States Patent

[11] 3,599,687

| | | |
|---|---|---|
| [72] | Inventor | William H. Tschantz<br>Kensington, Ohio |
| [21] | Appl. No. | 880,048 |
| [22] | Filed | Nov. 26, 1969 |
| [45] | Patented | Aug. 17, 1971 |
| [73] | Assignee | The Biro Manufacturing Company<br>Marblehead, Ohio |

[54] AUTOMATIC MEAT MIXER AND GRINDER
18 Claims, 13 Drawing Figs.

[52] U.S. Cl...................................................... 146/79,
146/186, 259/44, 259/108
[51] Int. Cl............................................................. Bo2c 18/30
[50] Field of Search........................................... 146/79,
181, 182, 186; 259/40, 41, 42, 43, 44, 45, 107, 108

[56]  References Cited
UNITED STATES PATENTS
2,368,977   2/1945  Fasold........................... 259/107
3,450,180   6/1969  Braun........................... 146/182
3,461,934   8/1969  Waters.......................... 146/79

*Primary Examiner*—Willie G. Abercrombie
*Attorney*—Frease & Bishop

ABSTRACT: An automatic meat mixer and grinder including a tub into which chunks of fresh meat, suet or fat, chipped frozen meat and condiments or the like may be fed. Mixing blades or paddles in the tub include two inwardly disposed angular paddles of different lengths and at different angles, upon diametrically opposite ends of radial arms upon a central rotary shaft, and two offset oppositely disposed paddles or blades of different lengths upon said shaft. A feed screw at the bottom of the tub conveys the mixed meat to a conventional food chopper including a perforate plate and rotary blade for grinding the mixed meat as desired.

PATENTED AUG 17 1971

INVENTOR.
William H. Tschantz
BY
Frease & Bishop
ATTORNEYS

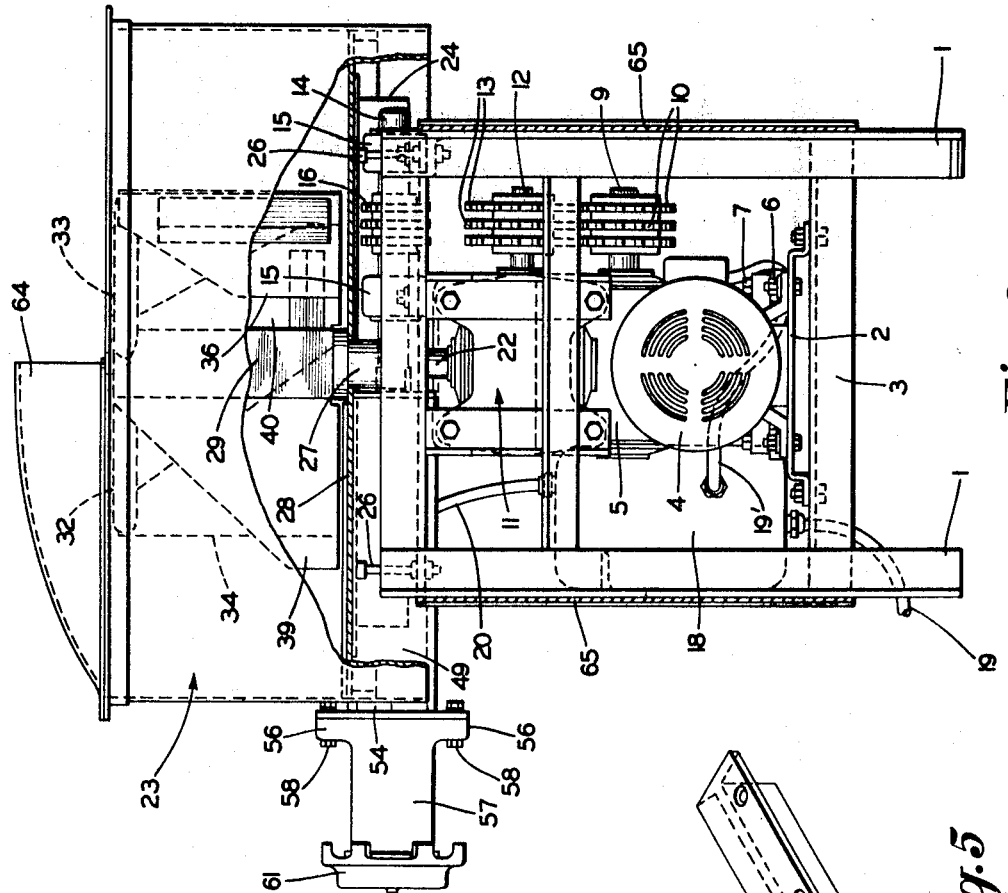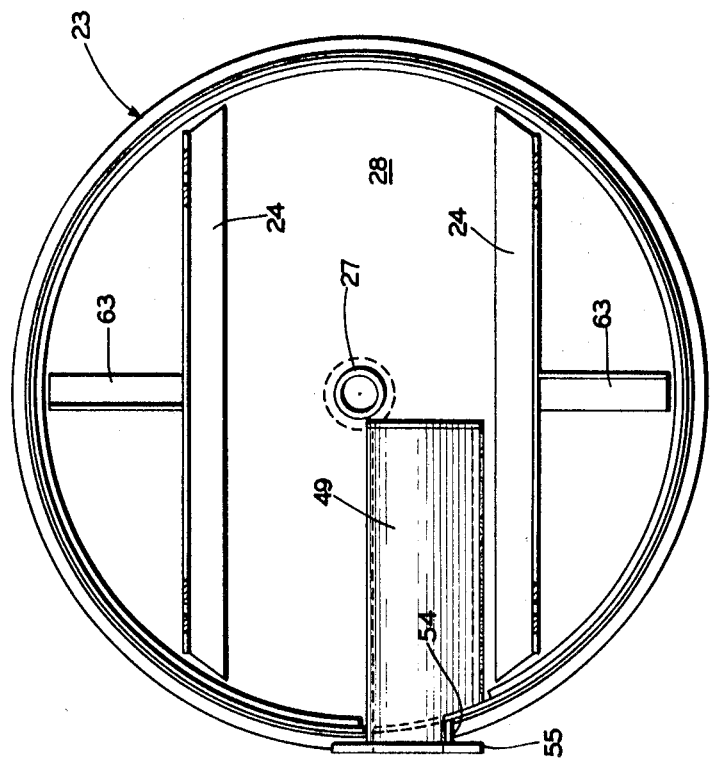

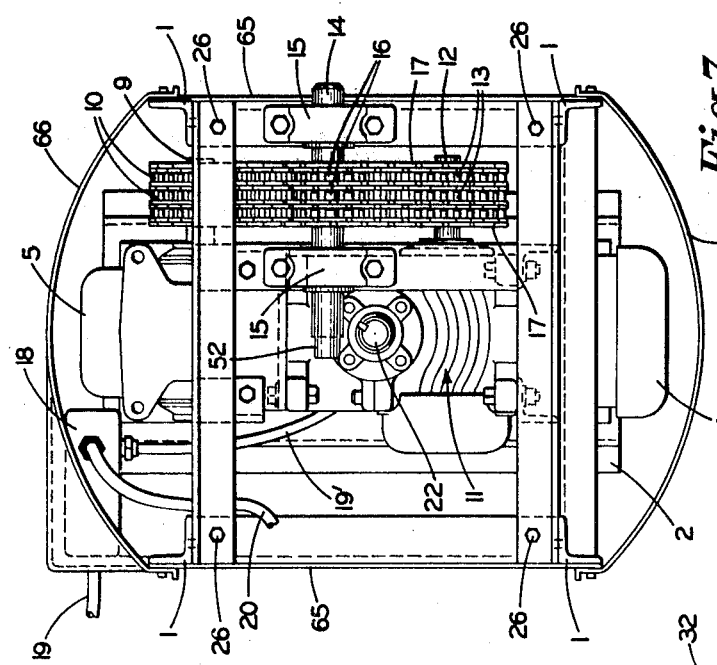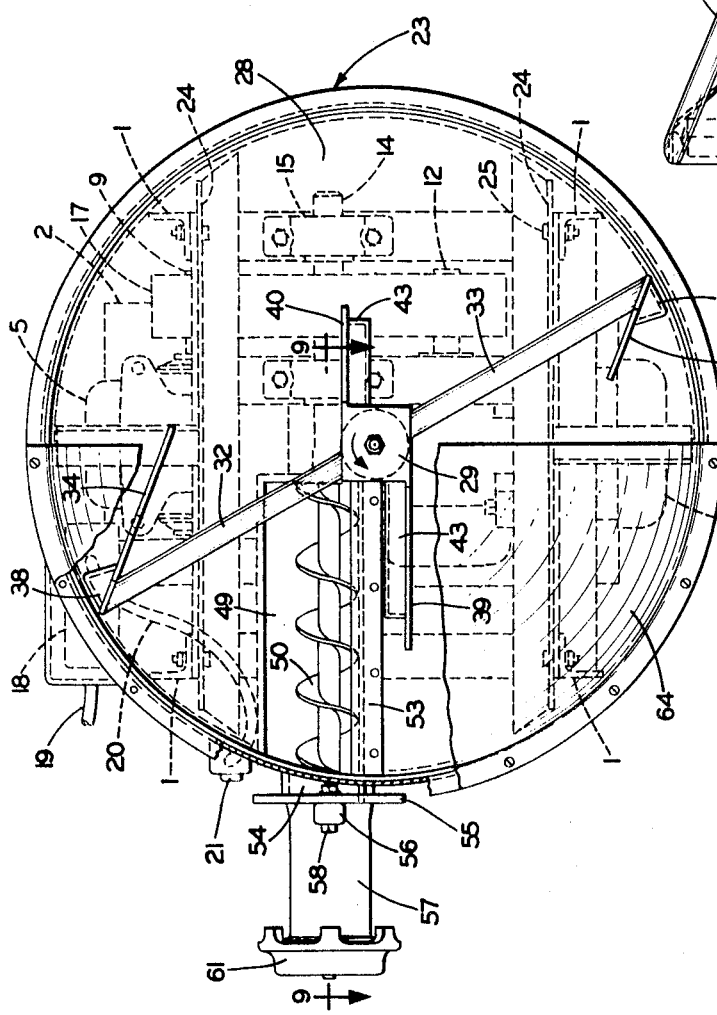

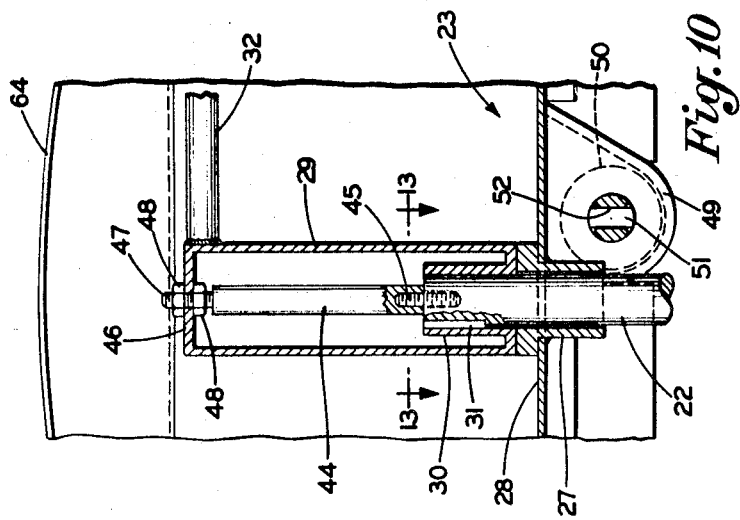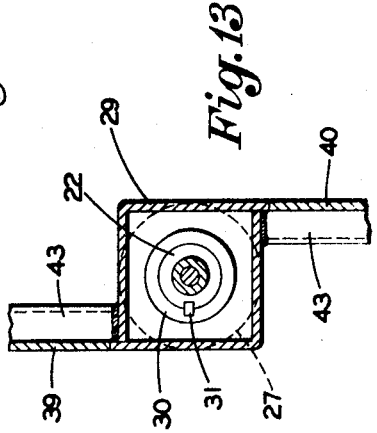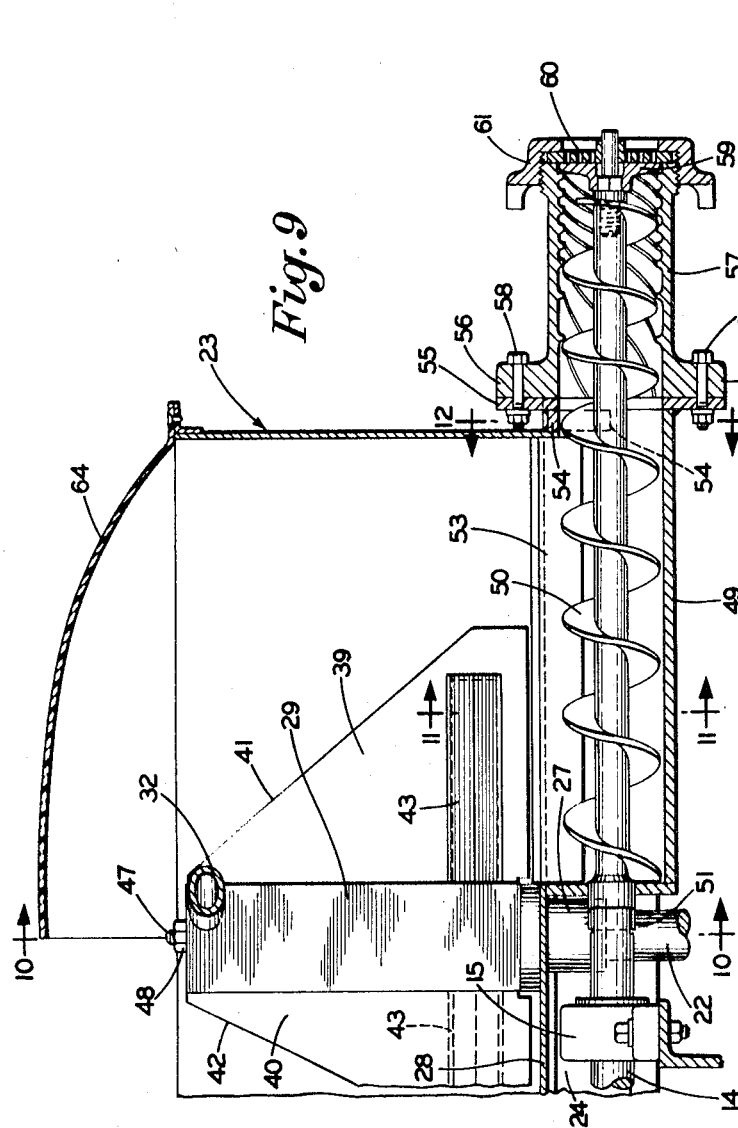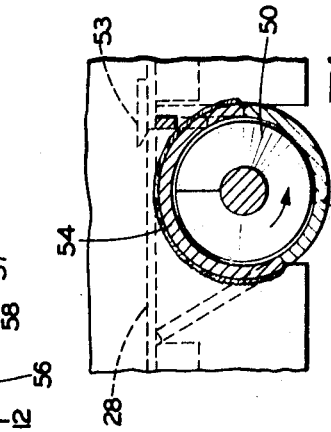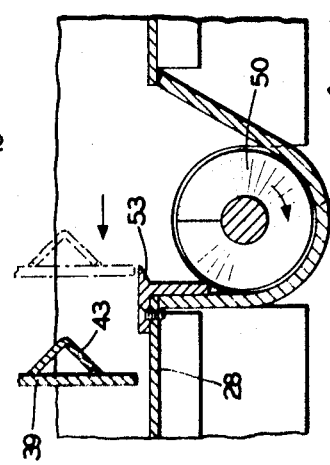

AUTOMATIC MEAT MIXER AND GRINDER

BACKGROUND OF THE INVENTION

1. Field of the Invention

The invention relates to a mixing and grinding machine especially designed for large quantities of meat in a minimum of time.

2. Description of the Prior Art

Although attempts have been made to provide machines for automatically mixing and grinding or chopping large quantities of meat, such as for instance in Hottmann, U.S. Pat. No. 1,416,204 dated May 16, 1922 in which the meat is mixed in a cylindrical tub by rotary paddles and fed therefrom by a feed screw into a food chopper, it is not known that any such machine has been proposed having rotary paddles of different lengths and at different angles, some of which push the meat toward the center of the tub and others of which push it outward from the center, as in applicant's machine.

SUMMARY OF THE INVENTION

In general terms, the invention may be generally described as comprising a cylindrical tub having a hollow vertical agitator post connected to a power-driven shaft.

A pair of diametrically opposite radial arms are fixed upon the agitator post and extend to the peripheral portion of the tub. Inwardly angled paddles or blades of different lengths are connected to the outer ends of the radial arms, at different angles thereto, for pushing meat inward from the peripheral portion of the tub toward the center thereof. At an angle to the radial arms are provided a pair of oppositely disposed offset paddles or blades of different lengths for pushing meat outwardly from the center toward the peripheral portion of the tub.

A radially disposed trough is provided in the bottom of the tub and a power-driven feed screw is located therein for feeding mixed meat wiped into the trough by the paddles to the conventional food chopper comprising a perforate plate and rotating blade.

The in-and-out movement of the meat during the rotation of the paddle assembly produces a thorough mixing in a sort of rollover action of the meat introduced into the tub. This meat will be a combination of various materials. For instance, for producing ground beef, chunks of fresh beef, suet, chopped frozen beef and condiments may be fed into the tub.

It is therefore a primary object of the invention to produce an automatic meat mixer and grinder including a tub, means within the tub for rapidly and thoroughly uniformly mixing various materials fed into the tub and means for grinding the mixed materials to desired fineness.

Another object of the invention is to provide such a mixer and grinder having rotary paddles or blades therein for pushing meat inwardly from the peripheral portion of the tub toward the center thereof and other paddles or blades for pushing meat outwardly from the center of the tub toward the periphery thereof.

A further object of the invention is to provide an automatic meat mixer and grinder of the character referred to in which there is a central vertical power-driven agitator post in the tub, diametrically opposed radial arms upon said agitator post extending to points adjacent to the periphery of the tub, inwardly angled paddles connected to the outer ends of the arms at different angles thereto, and offset paddles connected to the agitator post at angles to said radial arms.

A still further object of the invention is to provide an automatic meat mixer and grinder of this type in which the paddles are of different lengths.

These and other objects, apparent from the drawings and following description, may be attained, the above-described difficulties overcome and the advantages and results obtained, by the apparatus, construction, arrangement, and combinations, subcombinations and parts which comprise the present invention, a preferred embodiment of which, illustrative of the best mode in which applicant has contemplated applying the principle, being set forth in detail in the following description and illustrated in the accompanying drawings.

BRIEF DESCRIPTION OF THE DRAWINGS

FIG. 3 is a side elevation with parts broken in section for the purpose of illustration;

FIG. 4 is a bottom plan view of the tub;

FIG. 5 is a detached perspective view of the knife blade at one side of the feed screw trough;

FIG. 6 is a top plan view with the plastic hood or cover on the tub broken away;

FIG. 7 is a top plan view with the tub removed;

FIG. 8 is a detached perspective view of the agitator;

FIG. 9 is an enlarged fragmentary, vertical sectional view taken on the line 9–9, FIG. 6;

FIG. 10 is an enlarged fragmentary, vertical section on the line 10–10, FIG. 9;

FIG. 11 is an enlarged fragmentary, transverse section on the line 11–11, FIG. 9;

FIG. 12 is an enlarged fragmentary transverse section on the line 12–12, FIG. 9; and FIG. 13 is an enlarged transverse section through the agitator on the line 13–13, FIG. 10.

DESCRIPTION OF THE PREFERRED EMBODIMENT

Figure 2:
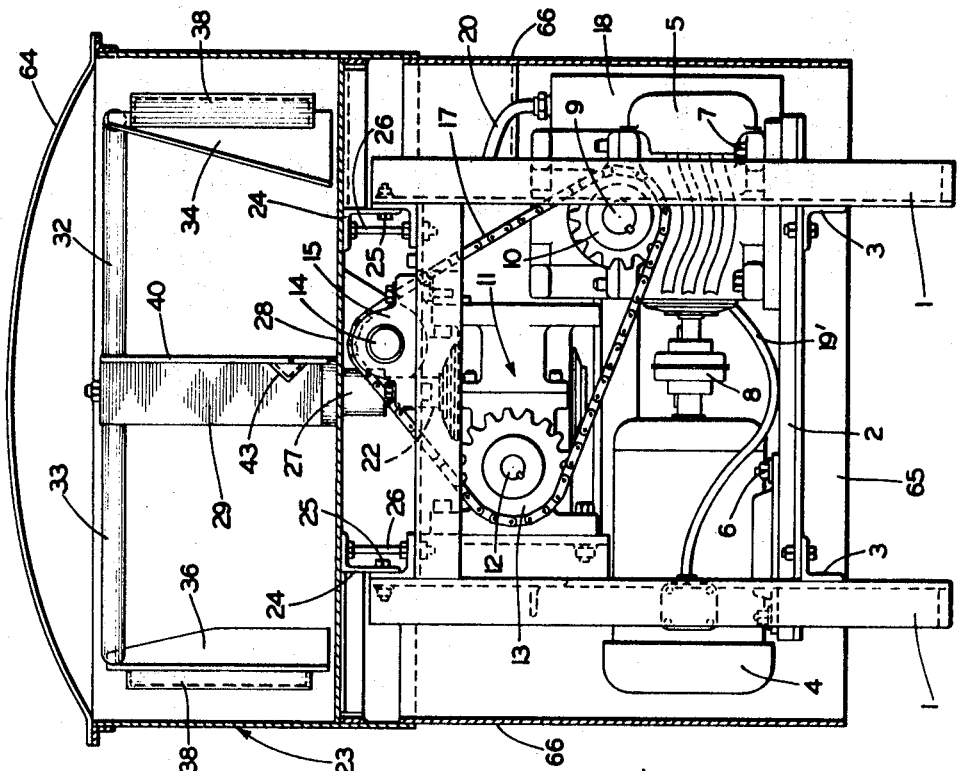
FIG. 2 is a rear view of the same, the tub and shield being shown in section.
Figure 1:
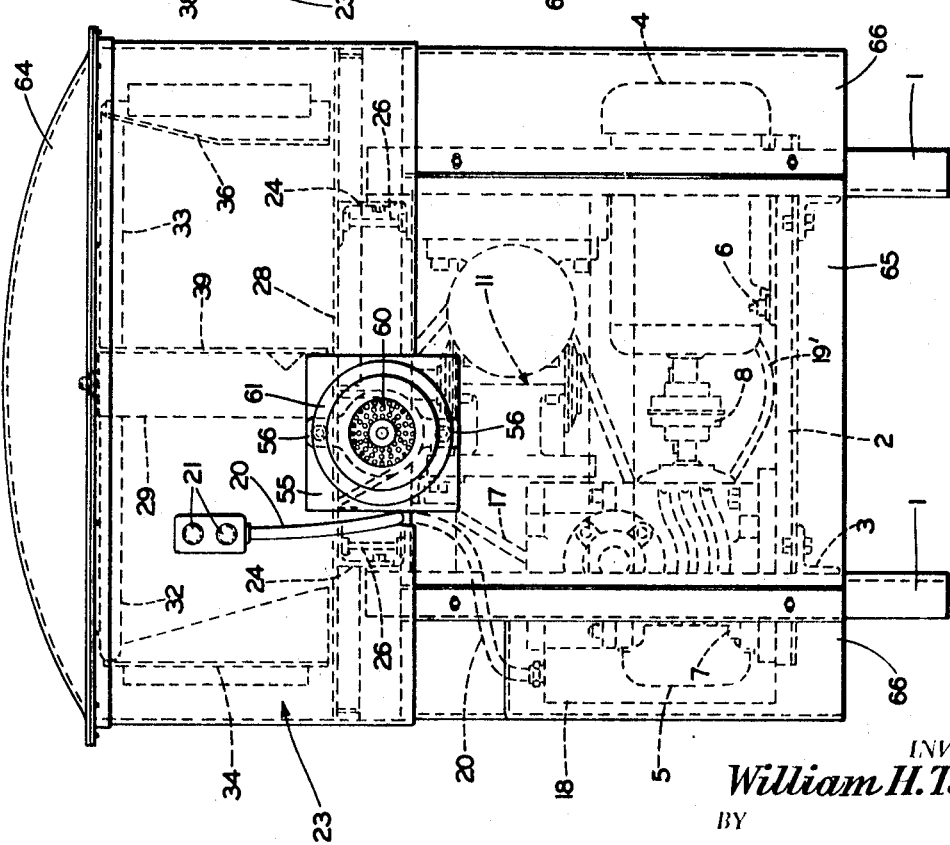
FIG. 1 is a front elevation of an automatic meat mixer and grinder embodying the invention.

Reference is now made to the embodiment of the invention illustrated in which similar numerals refer to similar parts throughout the various figures of the drawings.

The large chains of supermarkets and the like are recently changing procedure and are doing meat processing and butchering at one central commissary and then trucking prepackaged meat to the various stores, thus doing away with a butcher at each store or market.

This necessitates the processing and butchering of the meat in a minimum of time. For instance, in preparing large quantities of ground meat products automatic equipment is being used for mixing and grinding 200 to 400 pounds of meat in one batch. The present invention is designed for thoroughly and uniformly mixing and grinding large quantities of meat in a minimum of time, such as 200 to 400 pounds in 5 or 10 minutes.

The improved automatic meat mixer and grinder to which the invention pertains is supported upon a base frame comprising uprights 1, to which a lower platform 2 is attached as by angle irons 3.

A motor 4 and speed reducer 5, driven thereby, are mounted upon the platform 2 as by bolts 6 and 7. The motor 4 and speed reducer 5 are operatively connected by a conventional coupling as indicated at 8. The shaft 9 of the speed reducer 5 has a plurality of sprocket wheels 10 thereon.

A second speed reducer is indicated generally at 11, mounted in the base frame above the motor and has a shaft 12 upon which a plurality of sprocket wheels 13 are mounted. An auger drive shaft 14 is journaled in bearings 15 on the base frame and has a plurality of sprocket wheels 16 mounted thereon. Sprocket chains 17 are located around the sprocket wheels 10, 13 and 16.

An electric box 18 is mounted in the frame adjacent to the motor and a power line 19 leads from a suitable source of electric power thereto. A cable 19' leads from the electric box to the motor 4 and a cable 20 leads from the electric box to a series of switch buttons 21 by means of which the device is controlled. A vertically disposed shaft 22 leads upwardly from the top of the second speed reducer 11.

A cylindrical tub, indicated generally at 23, is connected to the top of the frame by angles 24 and bolts 25, spacer posts 26 being interposed between the same. The vertical shaft 22 is journaled through a bushing 27 located through a central aperture in the bottom wall 28 of the tub 23.

An agitator is connected to the vertical shaft 22 and includes the hollow post 29 which may be square in cross section as indicated. The hollow post 29 has at its lower end an upwardly disposed internal tubular portion 30 which receives the vertical drive shaft 22 and is keyed thereto as indicated at 31 in FIG. 13.

The agitator is best shown in FIGS. 6 and 8 and includes a pair of diametrically opposite radial arms 32 and 33 connected to the agitator post 29 and extending to the periphery of the tub 23.

An angularly disposed paddle or blade 34 with inclined upper edge 35 is attached to the outer end of the radial arm 32 and a shorter paddle or blade 36 located at a different angle and provided with an inclined upper edge 37 is attached to the outer end of the radial arm 33.

A vertical rib 38, triangular in cross section, is formed upon the outer end of each of the paddles or blades 35 or 36, on the trailing side thereof.

As shown in FIG. 6, the paddle 34 is located at an angle of about 40° to the radial arm 32 and the paddle 36 is located at about an angle of 35° to the radial arm 33.

As best shown in FIGS. 6 and 8, the radial arms 32 and 33 extend from diametrically opposite corners of the square hollow agitator post 29.

Extending in opposite directions from opposite sides of the agitator post 29 are offset blades or paddles 39 and 40. The blade 39 is of greater length than the blade 40. The upper edge of the blade 39 is inclined at 41 and the upper edge of the blade 40 is inclined as at 42. A horizontally disposed triangular rib 43 is mounted near the lower edge of each of the blades 39 and 40 on the trailing side thereof. The agitator is rotated in counterclockwise direction in the tub as indicated by the arrow in FIG. 6.

As shown in FIG. 10, the hollow agitator post 29 is connected to the vertical drive shaft 22 by a rod or bar 44 which is connected to the drive shaft 22 by a screw 45 and to the top wall 46 of the agitator post 29 by the bolt 47 and nuts 48.

A radially disposed auger trough 49 is located in the bottom of the tub 28 and extends from the center of the bottom of the tub to the periphery thereof. An auger or feed screw 50 is located in the auger trough 49 and has a flat tongue 51 at its inner end received in the slot 52 in the adjacent end of the auger drive shaft 15 so that the auger will be rotated thereby in the direction of the arrows shown in FIGS. 11 and 12.

A knife plate 53 is attached to one side of the auger trough 47, at the bottom wall 28 of the tub and the lower edges of the paddles or blades will pass thereover, as shown in FIG. 11, wiping mixed meat from the bottom of the tub into the auger trough.

An arcuate extension 54 upon the bottom wall of the tub has an attaching flange 55 formed thereon to which the flange 56 at the inner end of a conventional food chopper cylinder 57 is attached by bolts 58.

At the outer end of the auger is fixed a conventional rotary blade 59 which cooperates with the usual perforate plate 60 attached to the end of the chopper cylinder or housing 57, as by the flanged screw threaded ring 61.

The bottom wall 28 of the tub 23 is reinforced with a spaced pair of parallel angle irons 24, one located on each side of the center and a diametrically spaced pair of shorter angle irons 63 each extending from one of the angle irons 24 to the adjacent peripheral portion of the bottom of the top.

A domed cover 64 of plastic material or the like may be placed upon the top of the tub to keep dust and other foreign matter from contaminating the meat mixture being processed in the tub.

The mechanism carried by the base frame below the tub 23 may be protected by shields such as the two flat sheet metal panels 65 located on opposite sides of the base frame and the two curved sheet metal panels 66 located at opposite ends of the base frame, as best shown in FIG. 7.

OPERATION

In actual use the automatic meat mixer and grinder above described, may be used in connection with a conventional chipping device for chipping frozen meat and conveying it to the tub 23. Also, the mixed and ground meat may be delivered from the perforate chopper plate 60 into the tub of an automatic mixing and grinding machine which is a duplicate of the one described above.

For preparing ground beef, for example, suitable proportions of chipped frozen beef, chunks of fresh beef, suet and condiments may be placed in the tub 23 of the meat mixer or grinder where they will be quickly and thoroughly mixed by the continual inward and outward rollover movement of the mixture produced by the rotating blades or paddles 34, 36, 39, and 40.

After experimenting with and discarding between 30 and 40 arrangements of rotating blades or paddles, applicant has found that the arrangement described herein produced the most satisfactory results of quickly, thoroughly, and uniformly intermixing all of the ingredients placed in the tub 23 so that the first and last pounds of any batch to come out of the chopper are the same and intervening material is also the same.

The degree of uniformity of the mixture is dependent upon the degree of uniformity of sizing of the particulars being mixed. For this reason, it is preferred that the mixed and ground mixture be delivered from the chopper of a meat mixer and grinder, such as disclosed into the tub of an identical meat mixer and grinder, since everything delivered from the second mixer through the chopper may have the same particular size and thus uniformity of mixing is finally achieved in the second mixer and grinder.

In the foregoing description, certain terms have been used for brevity, clearness and understanding; but no unnecessary limitations are to be implied therefrom beyond the requirements of the prior art, because such terms are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of the preferred embodiment thereof, and the advantageous, new and useful results obtained thereby; the new and useful construction, and reasonable mechanical equivalents thereof obvious to those skilled in the art are set forth in the disclosure.

I claim:

1. A meat mixer and grinder including a tub, a central rotatable post in the tub, a pair of radial arms upon said post extending to the peripheral portion of the tub, angularly disposed paddles connected to the outer ends of said arms, a pair of diametrically offset paddles connected to the post at angles to said radial arms, means for rotating said post, a radially disposed auger trough in the bottom of said tub, a feed screw in said trough, and a food chopper at the outer end of said trough.

2. A meat mixer and grinder as defined in claim 1 in which the angularly disposed paddles extend inwardly from the outer ends of the radial arms.

3. A meat mixer and grinder as defined in claim 2 in which the angularly disposed paddles are located at different angles to the radial arms.

4. A meat mixer and grinder as defined in claim 2 in which the angularly disposed paddles are of different lengths.

5. A meat mixer and grinder as defined in claim 2 in which the angularly disposed paddles are of different lengths and are located at different angles to the radial arms.

6. A meat mixer and grinder as defined in claim 2 in which the diametrically offset paddles are of different lengths.

7. A meat mixer and grinder as defined in claim 2 in which all of the paddles are of different lengths.

8. A meat mixer and grinder as defined in claim 2 in which the upper edges of all of the paddles are downwardly inclined and in which the lower edges of the paddles are horizontal.

9. A meat mixer and grinder as defined in claim 2 in which there are vertical triangular ribs on the trailing sides of the angularly disposed paddles adjacent to the outer edges thereof.

10. A meat mixer and grinder as defined in claim 1 in which there are horizontally disposed triangular ribs near the lower edges of the diametrically offset paddles on the trailing sides thereof.

11. A meat mixer and grinder as defined in claim 1 in which there is a knife plate at one edge of the auger trough cooperating with the lower edges of the paddles.

12. A meat mixer and grinder as defined in claim 2 in which the paddles are all of different lengths and in which the upper edges of the paddles are all downwardly inclined and the lower edges of the paddles are horizontal and located just above the bottom wall of the tub.

13. A meat mixer and grinder as defined in claim 12 in which the angularly disposed paddles are located at different angles to the radial arms.

14. A meat mixer and grinder as defined in claim 12 in which there are vertical triangular ribs on the trailing sides of the angularly disposed paddles near their outer edges and horizontal triangular ribs on the trailing sides of the diametrically offset paddles near their lower edges.

15. A meat mixer and grinder as defined in claim 2 in which the angularly disposed paddles are located in different angles to the radial arms and are of different lengths, and in which the diametrically offset paddles are of different lengths, and in which there are vertical triangular ribs on the trailing sides of the angularly disposed paddles adjacent to the outer edges thereof, and horizontally disposed triangular ribs near the lower edges of the diametrically offset paddles on the trailing sides thereof.

16. A meat mixer and grinder as defined in claim 15 in which the upper edges of the paddles are all downwardly inclined and the lower edges of the paddles are horizontal and located just above the bottom wall of the tub.

17. A meat mixer and grinder as defined in claim 15 in which the food chopper thereof is arranged to discharge mixed and ground meat into the tub of a similar meat mixer and grinder.

18. A meat mixer and grinder as defined in claim 2 in which there is a removable domed cover on the tub.